(12) United States Patent
Mishuku (10) Patent No.: US 8,392,759 B2
(45) Date of Patent: Mar. 5, 2013

(54) TEST METHOD, TEST PROGRAM, TEST APPARATUS, AND TEST SYSTEM

(75) Inventor: Masaru Mishuku, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 300 days.

(21) Appl. No.: 12/789,800

(22) Filed: May 28, 2010

(65) Prior Publication Data

US 2011/0010586 A1    Jan. 13, 2011

(30) Foreign Application Priority Data

Jul. 9, 2009    (JP) .................................. 2009-162290

(51) Int. Cl.
*G06F 11/00*    (2006.01)
(52) U.S. Cl. .......................................... 714/25; 714/42
(58) Field of Classification Search .................... 714/25, 714/32, 40, 41, 42
See application file for complete search history.

(56) References Cited

U.S. PATENT DOCUMENTS

| | | | | |
|---|---|---|---|---|
| 5,835,703 | A * | 11/1998 | Konno | 714/42 |
| 6,754,853 | B1 * | 6/2004 | DeKoning et al. | 714/42 |
| 7,168,010 | B2 * | 1/2007 | Yadavalli et al. | 714/42 |
| 8,156,380 | B2 * | 4/2012 | Kalos et al. | 714/42 |

FOREIGN PATENT DOCUMENTS

| | | |
|---|---|---|
| JP | 58-046451 | 3/1983 |
| JP | 2000-207897 | 7/2000 |

* cited by examiner

*Primary Examiner* — Joseph D Manoskey
(74) *Attorney, Agent, or Firm* — Staas & Halsey LLP (57) ABSTRACT

A test method including executing a data transfer instruction with regard to transfer of data between a plurality of multiplexed storage devices and a plurality of main systems logically connected to the plurality of storage devices, storing an initial value of an operand upon execution of the data transfer instruction, re-setting the stored initial value to the operand upon occurrence of an interrupt triggered by an exception, and repeatedly executing the data transfer instruction and re-setting the stored initial value to the operand, by the main system accessing the storage device, until the data transfer instruction is completed normally.

11 Claims, 8 Drawing Sheets

TEST METHOD, TEST PROGRAM, TEST APPARATUS, AND TEST SYSTEM

CROSS-REFERENCE TO RELATED APPLICATION

This application is based upon and claims the benefit of priority of the prior Japanese Patent Application No. 2009-162290, filed on Jul. 9, 2009, the entire contents of which are incorporated herein by reference.

FIELD

The embodiments discussed herein are related to a test method, a test program, a test apparatus, and a test system.

BACKGROUND

In implementing tests by dynamically changing configurations of an apparatus (hereinafter, referred to as a "dynamic configuration change test"), the apparatus that is actually executing instructions (hereinafter, referred to as an "instruction execution apparatus") logically disconnects a target apparatus, to which the instruction execution apparatus is accessing, and checks instruction operations for cases where the access to the target apparatus is disabled.

The instruction execution apparatus has used an operating system (OS) to repeatedly execute the dynamic configuration change tests, in conventional dynamic configuration change tests. More specifically, the OS executes a test program(s) and raises an exception(s) on the test program by entering an OS command(s) for logically disconnecting at least one of the target apparatuses from the instruction execution apparatus, in the conventional dynamic configuration change tests. Thereafter, the OS repeatedly executes the dynamic configuration change tests by entering an OS command(s) for the purpose of reconnection of the logically disconnected target apparatus and by restoring the target apparatus to a connected state.

Moreover, the following method has been discussed as well: Upon detection of an abnormal operation during executing the program(s), the OS restarts the program(s), and repeats restarting the program(s) until normal operation is resumed.

In the above-discussed method, the program restart operation is carried out for preventing unexpected failures by detecting a program run-away. In consequence, the above-discussed method is not intended for the dynamic configuration change tests.

In a conventional system that includes multiplexed target apparatuses and the instruction execution apparatus and is capable of achieving the dynamic configuration change tests, the OS in the instruction execution apparatus logically disconnects one of the target apparatuses while it continues processing on the rest of the target apparatus(es). Consequently, for the purpose of multiplexing target apparatuses, the OS needs to match data on the disconnected target apparatus to data on the rest of the target apparatuses when the logically disconnected target apparatus is reconnected to the instruction execution apparatus. Therefore, the OS replicates the data on the logically disconnected target apparatus to the rest of the target apparatus(es) when the logically disconnected target apparatus is reconnected to the instruction execution apparatus. In other words, the logically disconnected target apparatus is restored to as it was.

For holding the same data on all target apparatuses during this restoration processing or this replication processing, the dynamic configuration change test needs to be interrupted. In so doing, the amount of storage capacity of the multiplexed target apparatuses reaches several gigabytes, so that it takes a couple of minutes for the restoration processing or the replication processing.

For the above-discussed reason, the test is interrupted for a couple of minutes each time the test is carried out. This has caused a disadvantage that test efficiency is low in the conventional dynamic configuration change test.

SUMMARY

According to an aspect of the embodiments, a test method including executing a data transfer instruction with regard to transfer of data between a plurality of multiplexed storage devices and a plurality of main systems logically connected to the plurality of storage devices, storing an initial value of an operand upon execution of the data transfer instruction, re-setting the stored initial value to the operand upon occurrence of an interrupt triggered by an exception, and repeatedly executing the data transfer instruction and re-setting the stored initial value to the operand, by the main system accessing the storage device, until the data transfer instruction is completed normally.

The object and advantages of the various embodiments will be realized and attained by means of the elements and combinations particularly pointed out in the claims.

It is to be understood that both the foregoing general description and the following detailed description are exemplary and explanatory and are not restrictive of the various embodiments, as claimed.

DESCRIPTION OF EMBODIMENTS

Hereinafter, various embodiments will be disclosed with reference to drawings.

Figure 1:
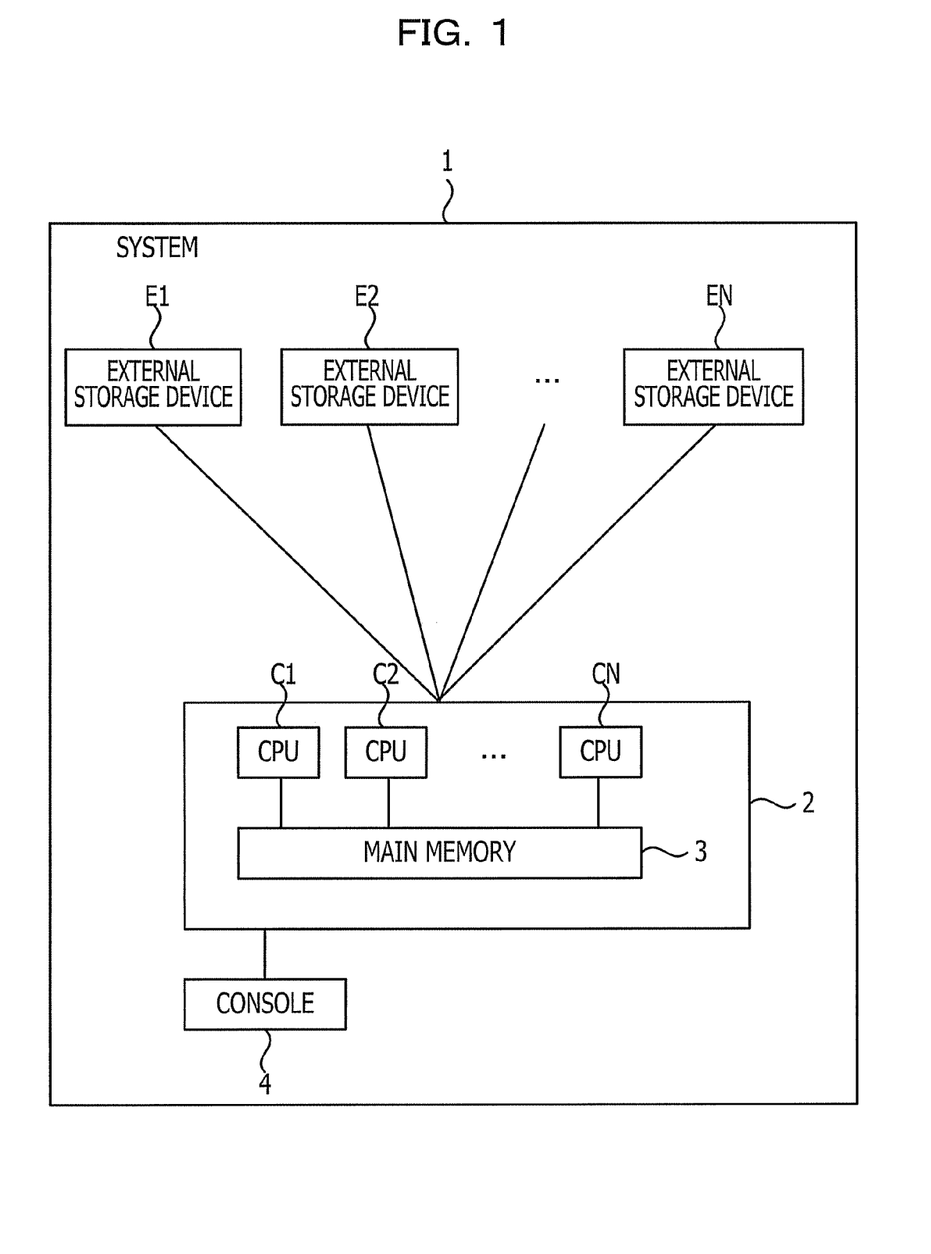
FIG. 1 illustrates a schematic block diagram of a system carrying out a test method according to an embodiment.

FIG. 1 illustrates a schematic block diagram of a system that carries out a test method according to an embodiment.

A system 1 illustrated in FIG. 1 includes a main system 2 as a test apparatus and a plurality of external storage devices E1 through EN. Note that "N" is a positive integer equal to or greater than two (2). The main system 2 is, for example, a computer or a server. The main system 2 includes a plurality of central processing units (CPUs) CPU C1 through CPU CN and a main memory 3. Note that "N" is a positive integer equal to or greater than two (2). In addition, the main system 2 is connected to a console 4, for example, a keyboard, a mouse, a monitor or the like, and the plurality of external storage devices E1 through EN. The main memory 3 stores an operating system (OS) and a variety of data.

The plurality of external storage devices E1 through EN is multiplexed, and each of the external storage devices holds the same data therein. Furthermore, the external storage devices E1 through EN may be, for example, a semiconductor memory, a hard disk, or a storage unit so-called a system storage unit (SSU), and the external storage devices E1 through EN are capable of being logically disconnected from the main system 2. The external storage devices E1 through EN may be incorporated into the main system 2 as long as it may be logically disconnected from the main system 2. In FIG. 1, the system 1 includes a single main system 2. However, the system 1 may include a plurality of main systems capable of accessing to the external storage devices E1 through EN.

Upon execution of a write instruction by each of the CPUs, the same data is written to the plurality of external storage devices that have been specified in advance. Moreover, upon execution of a read instruction by each of the CPUs, the data is read from one of the external storage devices. Note that the one external storage device has been specified in advance.

In the system 1 illustrated in FIG. 1, the main system 2 carries out a test by dynamically changing configurations of the external storage device (hereinafter, referred to as a "dynamic configuration change test"). An instruction of transferring the data between the main system 2 and the external storage devices E1 through EN and an instruction of changing configurations of the main system 2 and the plurality of external storage devices (hereinafter, referred to as a "configuration change instruction") are concurrently executed in the dynamic configuration change tests. For this reason, the main system 2 includes the plurality of CPUs for performing two (2) instructions concurrently. Note that the configuration change instruction is, for example, an instruction that logically disconnects one (1) of the CPUs and the external storage device corresponding thereto, from the system 1.

In addition, when the configuration of the external storage device is changed while the plurality of CPUs are executing the data transfer instruction, timing of a plurality of data transfer operations is capable of being checked all at once, so that the checking efficiency may be improved. In the above case, the execution of the configuration change instruction by the plurality of CPUs results in unforeseen configuration change. Therefore, the configuration change instruction is executed by one (1) of the CPUs within the main system 2.

Furthermore, when the CPU executing the data transfer instruction and the CPU executing the configuration change instruction are shared within a single main system, this case may be an implementation that does not concurrently execute the data transfer instruction and the configuration change instruction with the single main system. In the above case, one of the main systems executes the data transfer instruction and the other main system executes the configuration change instruction.

Figure 2:
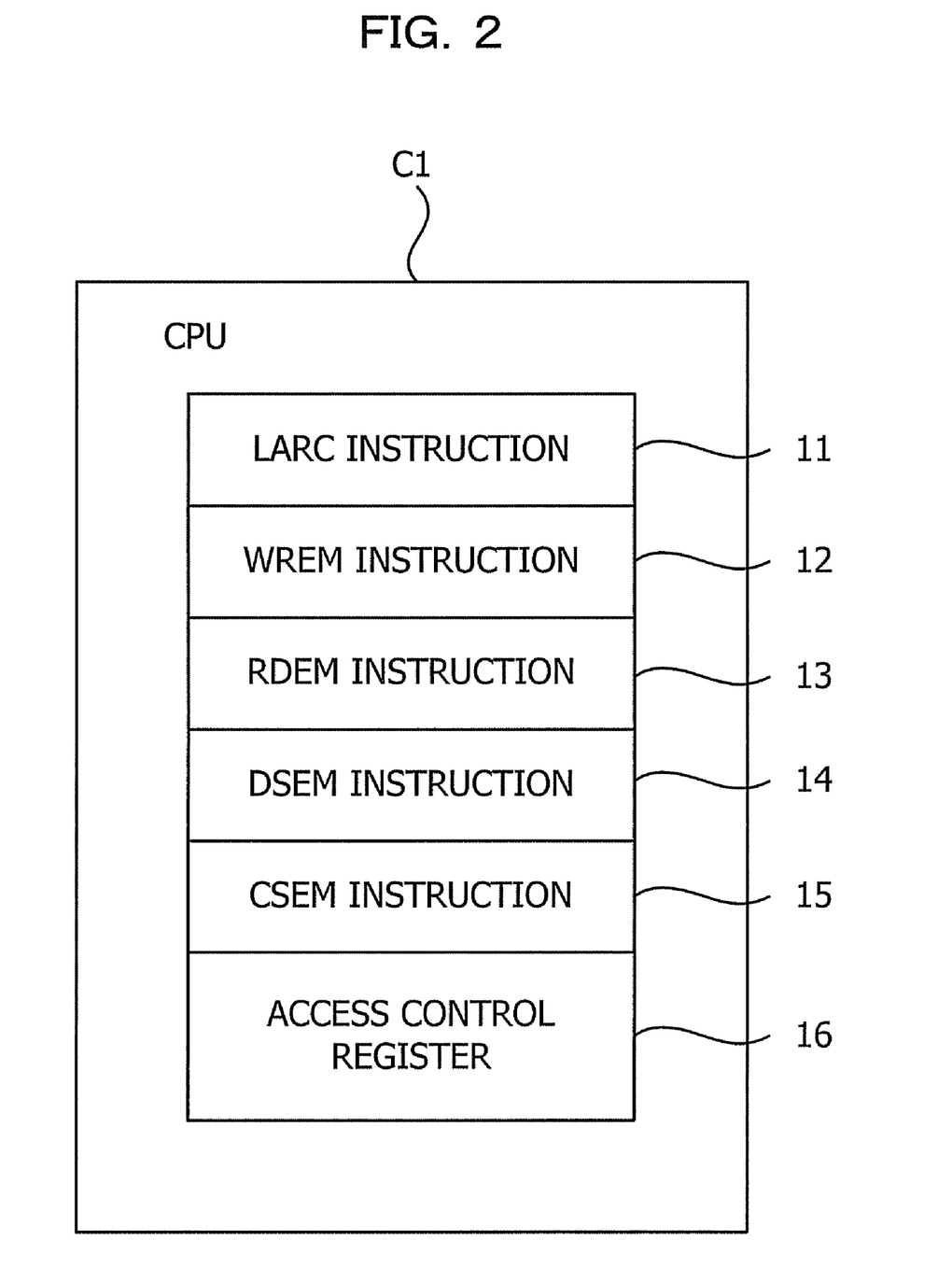
FIG. 2 illustrates instructions executed by each of central processing units (CPUs) and access control registers of each of the CPUs.
Figure 3A:
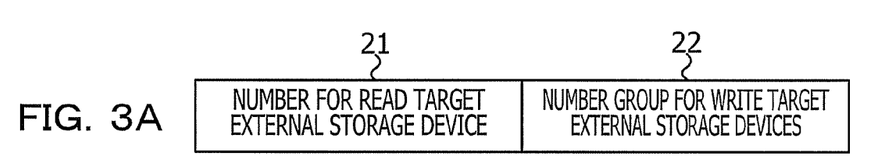
FIG. 3A illustrates a diagram that indicates a configuration of the access control register and FIGS. 3B through 3F each illustrate a configuration of a LARC instruction, a configuration of a WREM instruction, a configuration of a RDEM instruction, a configuration of a DSEM instruction, and a configuration of a CSEM instruction.

FIG. 2 illustrates instructions executed by each of the CPUs and access control registers of each of the CPUs. The description will be made with reference to the CPU C1 in FIG. 2. Note, however, that the following description is applicable to the other CPUs. FIG. 3A illustrates a configuration of the access control register. FIGS. 3B through 3F each illustrate a configuration of a LARC instruction 11, a configuration of a WREM instruction 12, a configuration of a RDEM instruction 13, a configuration of a DSEM instruction 14, and a configuration of a CSEM instruction 15.

As illustrated in FIG. 2, the CPU C1 includes an access control register 16 and executes the LARC instruction 11, the WREM instruction 12, the RDEM instruction 13, the DSEM instruction 14, and the CSEM instruction 15.

As illustrated in FIG. 3A, the access control register 16 includes a field 21 and a field 22. The field 21 indicates the number for the external storage device from which the CPU C1 reads the data. The field 22 indicates a group of numbers for the external storage devices to which the CPU C1 writes the data. For example, when a bit "n" on the field 21 is E1, the CPU C1 reads the data from the external storage device E1. When a bit "n" on the field 22 is E1, the CPU C1 writes the data to the external storage device E1.

Figure 3B:
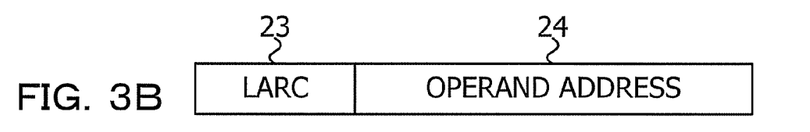

The LARC instruction 11 includes a header 23 that indicates a LARC instruction and a field 24 that indicates an operand address, as illustrated in FIG. 3B. The operand address is an address in the main memory 3. Upon execution of the LARC instruction 11, the CPU C1 writes data that is stored in a memory area specified by an address of the main memory 3 to the access control register 16. Note that, the address of the main memory 3 is specified by the operand address.

Figure 3C:
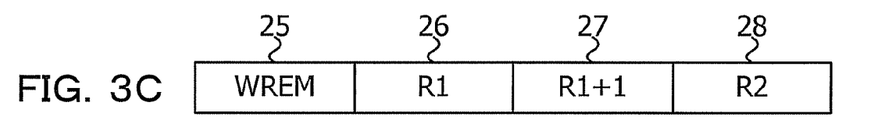

As illustrated in FIG. 3C, the WREM instruction 12 includes a header 25 that indicates a WREM instruction, a field 26 that indicates contents of a general-purpose register R1, a field 27 that indicates contents of a general-purpose register R1+1, and a field 28 that indicates contents of a general-purpose register R2. The contents of the general-purpose register R1 indicate an address of the external storage device. The contents of the general-purpose register R1+1 indicate data length of the write data. The contents of the general-purpose register R2 indicate an address of the main memory 3. Upon execution of the WREM instruction 12, the CPU C1 writes the data, from the main memory 3, to the external storage devices specified by the field 22 of the access control register 16.

When the contents of the general-purpose register R1+1 are "0", the CPU C1 terminates the instruction normally without transferring the data. When a part or all of the data is written to a part or all of the external storage devices, the length of the written data is added to the contents of the general-purpose registers R1 and R2. The contents of the general-purpose register R1+1 are reduced by the length of the data having been written therein. When a part of the multiplexed external storage devices is logically disconnected while the data is being written therein, the data is written to the rest of the external storage devices, so that a program interrupt occurs. The interrupt information of this program interrupt represents the number for the external storage device having been disconnected.

Figure 3D:
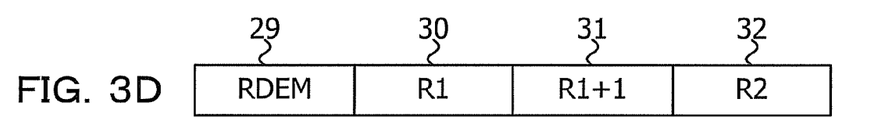

The RDEM instruction 13 includes a header 29 that indicates an RDEM instruction, a field 30 that indicates contents of a general-purpose register R1, a field 31 that indicates contents of a general-purpose register R1+1, and a field 32 that indicates contents of a general-purpose register R2, as illustrated in FIG. 3D.

The contents of the general-purpose register R1 indicate an address of the main memory 3. The contents of the general-purpose register R1+1 indicate a data length of the read data. The contents of the general-purpose register R2 indicate an address of the external storage device. Upon execution of the RDEM instruction 13, the CPU C1 reads the data to the main memory 3 from the external storage device specified by the field 21 of the access control register 16.

When the contents of the general-purpose register R1+1 are "0", the CPU C1 terminates the instruction normally without transferring the data. When a part or all of the data is read from the external storage device, the length of the read data is added to the contents of the general-purpose registers R1 and R2. The contents of the general-purpose register R1+1 are reduced by the length of the data having been read therefrom. When the external storage device is logically disconnected while the data is read therefrom, each operand (that is to say, each general-purpose register) is updated by the length of the data, which has already been read, so that the program interrupt occurs. The interrupt information of this program interrupt represents the number for the external storage device having been disconnected.

Figure 3E:
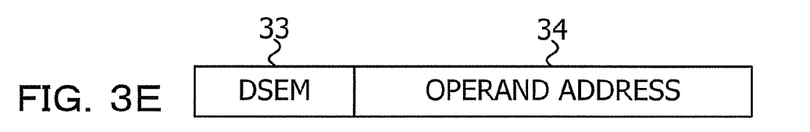

The DSEM instruction 14 includes a header 33 that indicates a DSEM instruction and a field 34 that indicates an operand address, as illustrated in FIG. 3E.

Upon execution of the DSEM instruction 14, the CPU C1 logically disconnects the external storage device(s), which corresponds to the data for the group of the numbers stored in a memory area specified by an address of the main memory 3, from all the main systems (the main system 2 in FIG. 1). Note that the address of the main memory 3 is specified by the operand address. For example, when the data for the group of the numbers stored in the memory area specified by the address of the main memory 3 (this address of the main memory 3 is specified by the operand address) is E1 and E2, the CPU C1 logically disconnects the external storage devices E1 and E2 from the main system 2.

Figure 3F:
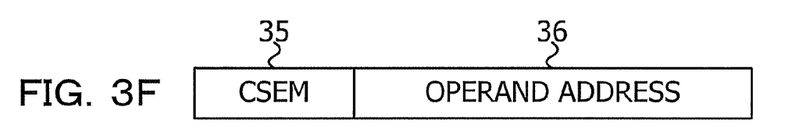

The CSEM instruction 15 includes a header 35 that indicates a CSEM instruction and a field 36 that indicates an operand address, as illustrated in FIG. 3F.

Upon execution of the CSEM instruction 14, the CPU C1 logically connects the external storage device(s), which corresponds to the data for the group of the numbers stored in the memory area specified by the address of the main memory 3 (this address of the main memory 3 is specified by the operand address), to all the main systems (the main system 2 in FIG. 1). For example, when the data for the group of the numbers stored in the address of the main memory 3 (this address of the main memory 3 is specified by the operand address) is E1 and E2, the CPU C1 logically connects the external storage devices E1 and E2 to the main system 2.

FIG. 4, FIGS. 5A and 5B, and FIGS. 6A and 6B illustrate flowcharts each indicating processing for the dynamic configuration change test carried out by the present system. In this processing, it is assumed that the plurality of CPUs, capable of concurrently executing the data transfer instruction and the configuration change instruction, causes a program for the dynamic configuration change test to run concurrently.

Figure 4:
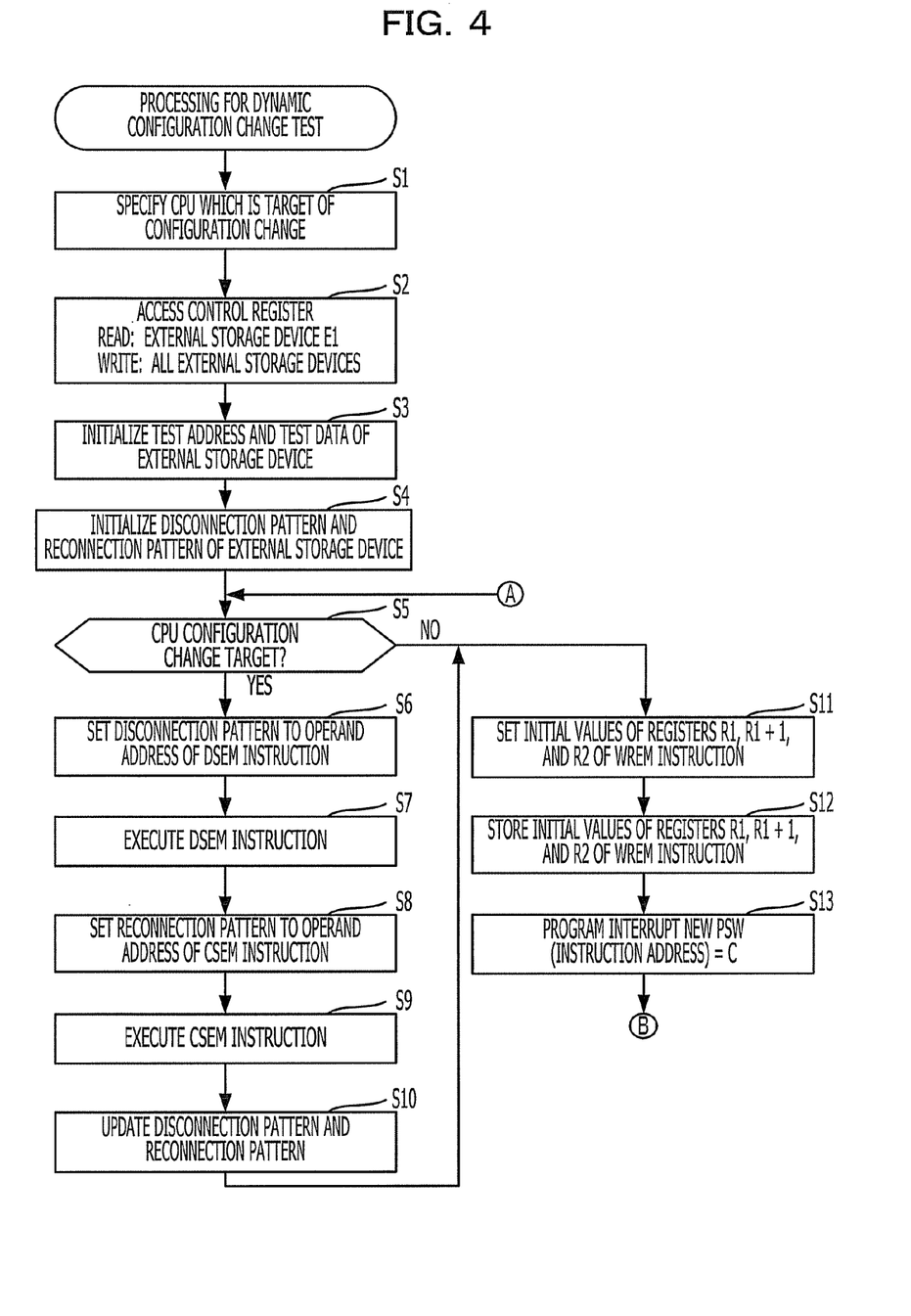
FIG. 4 illustrates a flowchart that indicates processing of a dynamic configuration change test carried out by the system.
Figure 5A:
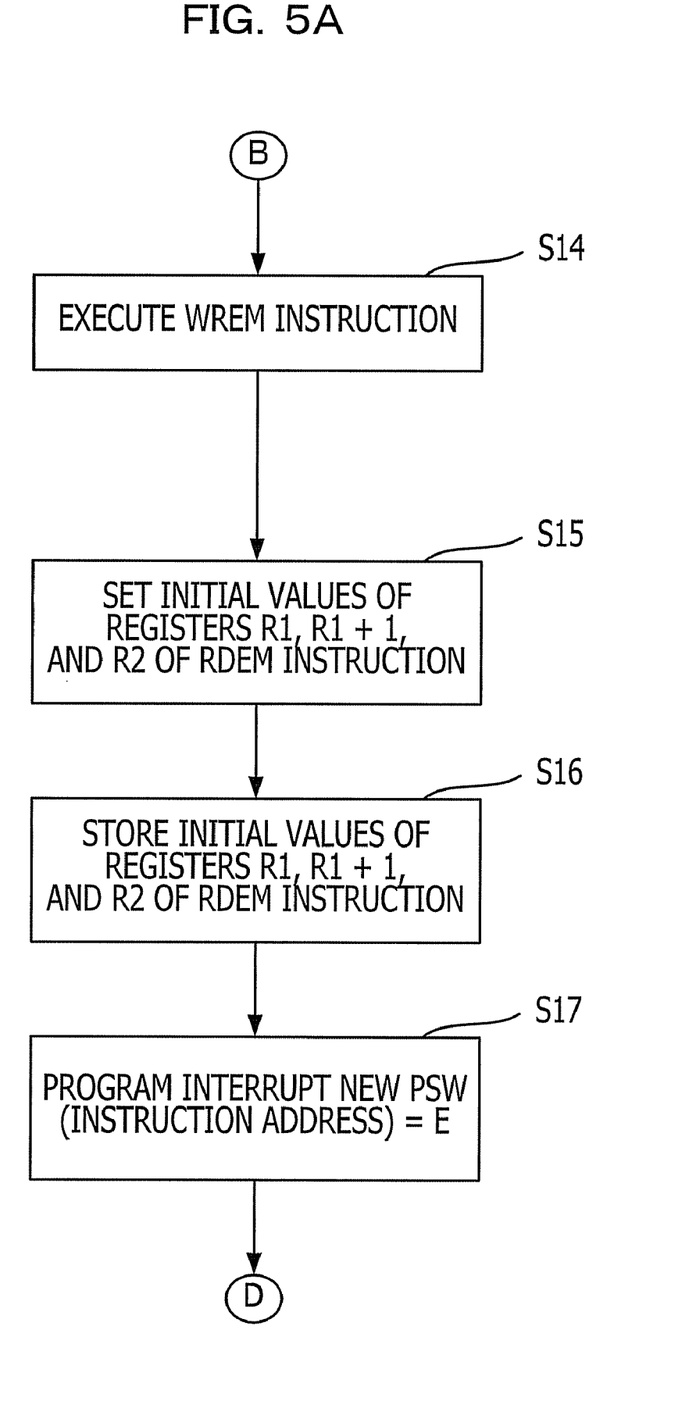
FIGS. 5A and 5B each illustrate a flowchart that follows the processing in FIG. 4.
Figure 5B:
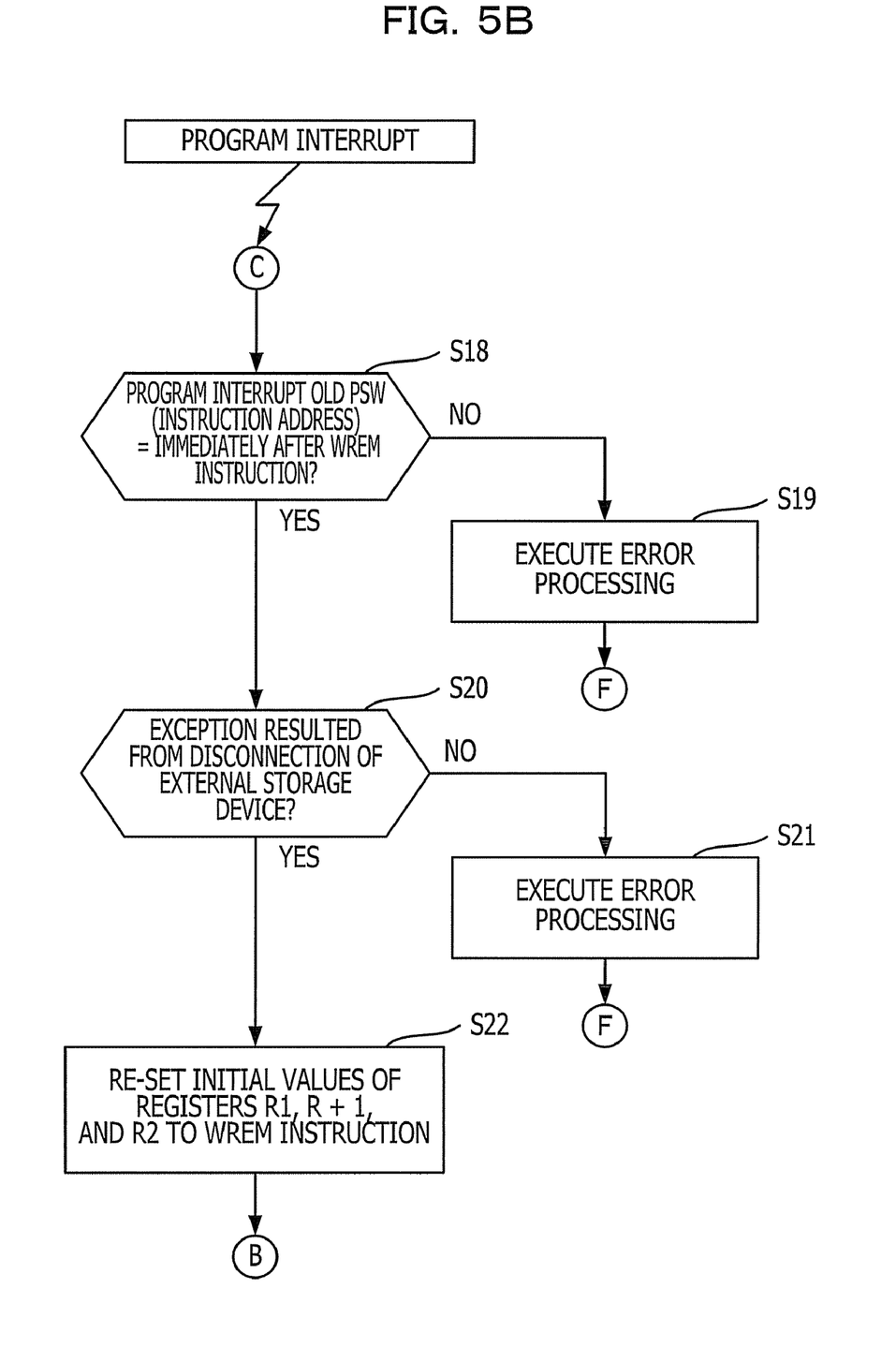
Figure 6A:
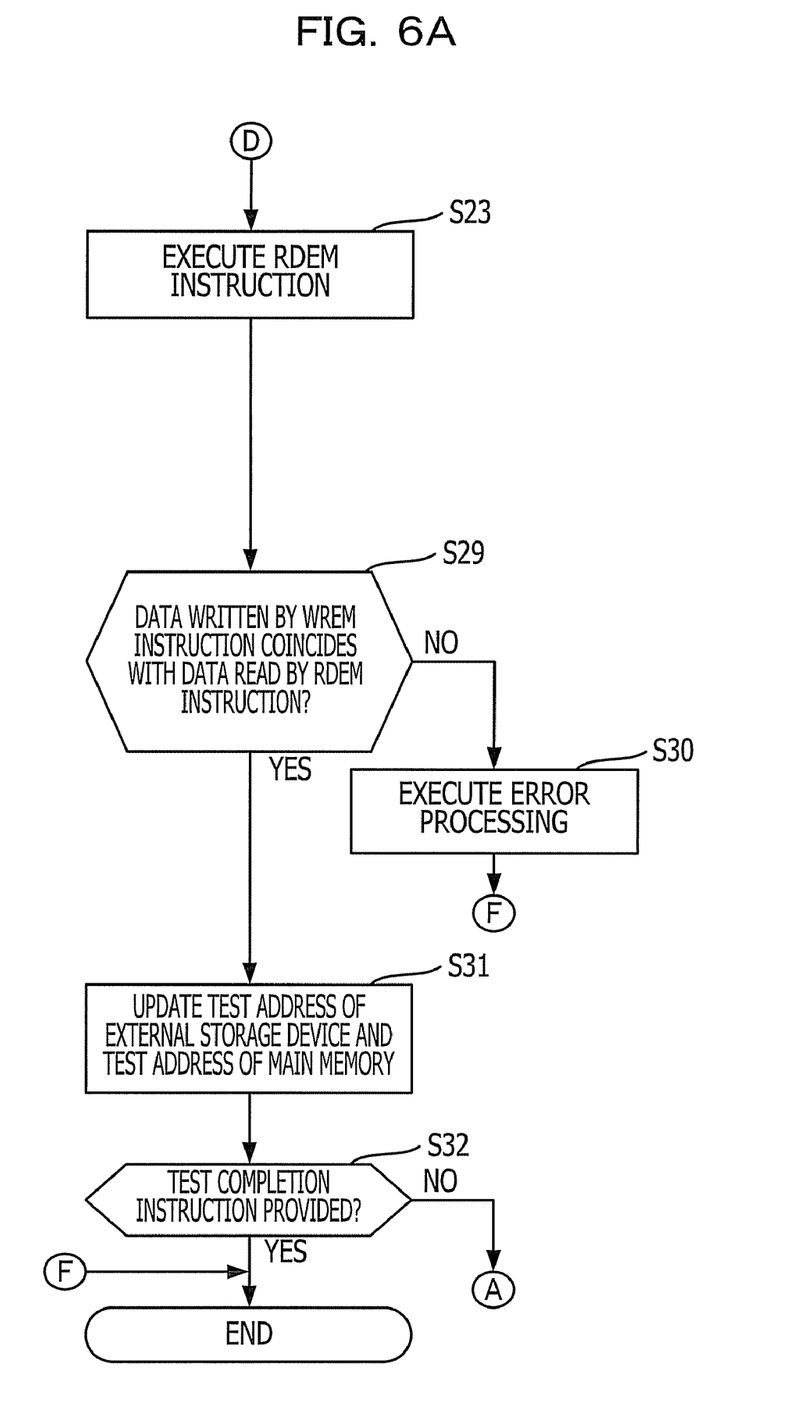
FIGS. 6A and 6B each illustrate a flowchart that follows the processing in FIG. 5A.
Figure 6B:
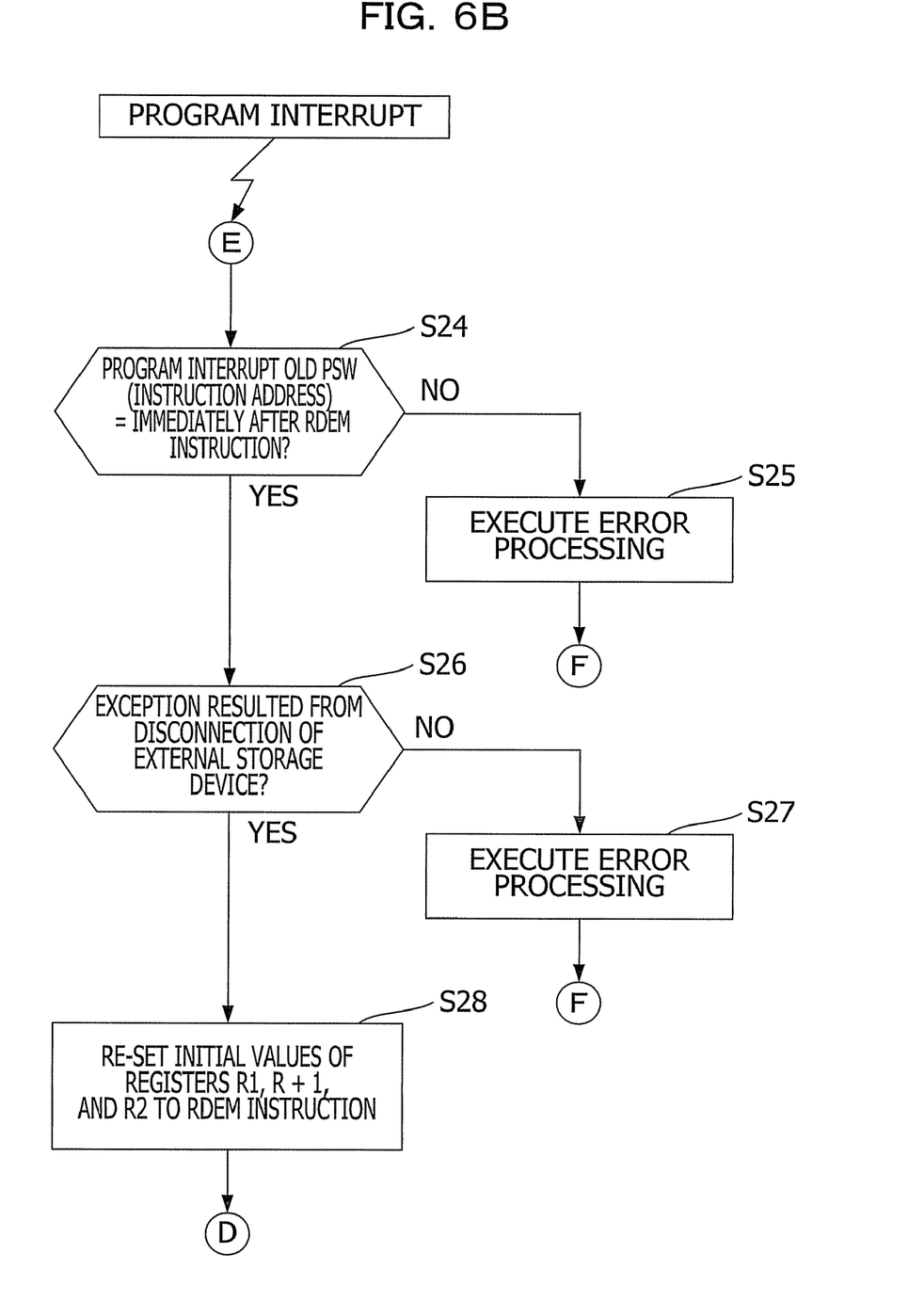

In FIG. 4 and FIG. 5A, a program interrupt new program status word (PSW) is a piece of information in which control information that causes interrupt processing to be performed in response to the program interrupt is written. The program is written to a certain address in the main memory 3. An instruction address of this PSW is an entry instruction address of the interrupt processing and is represented as the program interrupt new PSW (instruction address) in FIGS. 4 and 5A. In FIGS. 5B and 6B, a program interrupt old PSW is program operation control information in response to the occurrence of the program interrupt. Hardware, for example, the CPU or the like, writes this program operation control information, as the program interrupt operation, to a certain address in the main memory 3. The instruction address of this PSW is an address of the instruction to be executed (typically, an instruction address subsequent to the occurrence of the interrupt) when no interrupt occurs. The instruction address of this PSW is represented as the program interrupt old PSW (instruction address) in FIGS. 5B and 6B.

Hereinafter, an outline of the program interrupt operation will be disclosed. Upon detection of a state where the hardware, for example, the CPU or the like, does not terminate an instruction normally (that is to say, an "exception") while it executes the instruction, it makes no sense that the hardware executes the following instruction(s). As a result thereof, the hardware switches the following instruction(s) to processing used upon occurrence of the exception. This switching operation is referred to as the "interrupt." The interrupt operation is performed by writing the program interrupt new PSW information to the PSW after the hardware stores the PSW information in the program interrupt old PSW. Note that information or the like that indicates a factor(s) and/or a cause(s) of the interrupt is stored in a certain address in the main memory 3 upon storing the PSW information in the program interrupt old PSW.

Returning to FIG. 4, first of all, upon starting the program (S1), a user specifies one of the all CPUs as the CPU that is a target of the configuration change.

For example, each of the CPUs specifies the external storage device E1 as the external storage device on which the data in the access control register 16 is read out and specifies all the external storage devices as the external storage devices to which the data is written in (S2). More specifically, each of the CPUs sets "E1" to the field 21 in the access control register 16 and sets "E1, E2 through EN" to the field 22.

Thereafter, each of the CPUs initializes test addresses and test data for the external storage devices (S3) and initializes disconnection patterns and reconnection patterns for the external storage devices (S4).

Next, each of the CPUs determines whether or not each is specified as the CPU that is the target of the configuration change (S5).

In response to the determination at S5 being "YES", the CPU, specified as the target of the configuration change, sets a disconnection pattern of an external storage device to a memory area specified by an operand address of the DSEM instruction (S6) and executes the DSEM instruction (S7). Then, the CPU specified as the target of the configuration change sets a reconnection pattern of the external storage device to a memory area specified by an operand address of the CSEM instruction (S8) and executes the CSEM instruction (S9). Thereafter, the CPU specified as the target of the configuration change updates the disconnection pattern of the external storage device and the reconnection pattern of the external storage device (S10) and executes a procedure in S11 disclosed below.

In response to the determination at S5 being "NO", each of the CPUs sets initial values of the register R1, the register R1+1, and the register R2 of the WREM instruction 12 (S11) and stores the initial values of the register R1, the register R1+1, and the register R2 of the WREM instruction 12 in the main memory 3 (S12).

Here, each of the CPUs sets an interrupt destination C (see FIG. 5B) to the instruction address of the program instruction new PSW (S13) for specifying processing when the WREM instruction causes an interrupt triggered by the exception.

Then, each of the CPUs executes the WREM instruction (S14). When the processing is terminated normally without detection of the exception, S15 is executed subsequent thereto.

After S13, when the program interrupt triggered by the exception is caused in S14, S18 is executed subsequent thereto.

In operation S18, each of the CPUs determines whether or not the program interrupt old PSW (instruction address) follows immediately after the WREM instruction. In response to the determination at S18 being "NO", each of the CPUs executes given error processing (S19), and the processing is terminated. In response to the determination at S18 being "YES", each of the CPUs determines whether or not the detected exception is resulted from the disconnection of the external storage device (S20). In response to the determination at S20 being "NO", each of the CPUs executes the given error processing (S21), and the processing is terminated. In response to the determination at 20 being "YES", each of the CPUs re-sets the initial values of the register R1, the register R1+1, and the register R2 stored at S12 (S22) for the WREM instruction 12 and executes the WREM instruction 12 (S14). In S18 and S20 as disclosed above, each of the CPUs determines whether or not the exception is appropriately detected. Moreover, a data write test is carried out based on S11 through S14 or S22 through S14.

Upon the normal termination of the processing without detecting the exception at S14, then, the processing proceeds to S15. Each of the CPUs sets initial values of the registers R1, the register R1+1, and the register R2 of the RDEM instruction 13 (S15) and stores the initial values of the register R1, the register R1+1, and the register R2 of the RDEM instruction 13 in the main memory 3 (S16).

Each of the CPUs sets an interrupt destination E (see FIG. 6 (B)) to the instruction address of the program interrupt new PSW (S17) for specifying processing when the RDEM instruction causes the interrupt triggered by the exception.

Each of the CPUs executes the RDEM instruction (S23). When the processing is terminated normally without detection of the exception, S29 is executed subsequent thereto.

Subsequent to S17, upon detection of the exception in S23 and occurrence of the program interrupt, S24 is executed subsequent thereto.

Each of the CPUs determines whether or not the program interrupt old PSW (instruction address) follows immediately after the RDEM instruction, in S24. In response to the determination at S24 being "NO", each of the CPUs executes the given error processing (S25), and the processing is terminated. In response to the determination at S24 being "YES", each of the CPUs determines whether or not the detected exception is resulted from the disconnection of the external storage device (S26). In response to the determination at S26 being "NO", each of the CPUs executes the given error processing (S27), and the processing is terminated. In response to the determination at S26 being "YES", each of the CPUs re-sets the initial values of the register R1, the register R1+1, and the register R2 stored at S16 for the RDEM instruction 13 (S28) and executes the RDEM instruction 13 (S23). In S24 and S26, each of the CPUs determines whether or not the exception is appropriately detected. In addition thereto, a data read test is performed based on S15 through S24 or S28 through S23.

After S23, each of the CPUs determines whether or not the data written by the WREM instruction 12 coincides with the data read by the RDEM instruction 13 (S29). This determination allows checking whether or not the data transfer between the CPU(s) and the main system is appropriately performed.

In response to the determination at S29 being "NO", each of the CPUs executes the given error processing (S30) and the processing is terminated. In response to the determination at S26 being "YES", each of the CPUs updates the test addresses of the external storage devices and a test address of the main memory (S31). Thereafter, each of the CPUs determines whether or not a test completion instruction has been provided (S32). In response to the determination at S32 being "YES", each of the CPUs terminates its processing. In response to the determination at S32 being "NO", each of the CPUs returns to S5.

Each of the CPUs repeats reexecution of the instructions based on loop processing of S14 (occurrence of interrupt), S18 through S22 (based on the instruction of S13), and S14 while the exception is being detected by the write instruction (WREM instruction 12). In response to the reconnection of the disconnected external storage device to the main system 2, 814 is terminated normally without causing the interrupt, and S15 is executed subsequent thereto.

Each of the CPUs repeats reexecution of the instructions based on loop processing of S23 (occurrence of interrupt), S24 through S28 (based on the instruction of S17), and S23 while the exception is being detected by the read instruction (RDEM instruction 13). In response to the reconnection of the disconnected external storage device to the main system 2, S23 is terminated normally without causing the interrupt, and S29 is executed subsequent thereto.

That is to say, in response to the reconnection of the disconnected external storage device to the main system 2, the CPU that is re-executing the instruction for the purpose of the data transfer to/from the external storage device is capable of reading the data before the disconnection by executing the read instruction (RDEM instruction 13) immediately after the reconnection. In addition, in response to the reconnection of the disconnected external storage device to the main system 2, the CPU that is re-executing the instruction for the purpose of the data transfer to/from the external storage device is capable of writing the data before the disconnection by executing the writing instruction (WREM instruction 12) immediately after the reconnection. Thus, the plurality of data stored in all the external storage devices connected to the main system 2 coincide with each other immediately after the reconnection of the disconnected external storage device to the main system 2. In the same manner, the plurality of data read from all the external storage devices connected to the main system 2 coincide with each other immediately after the reconnection of the disconnected external storage device to the main system 2.

For the write instruction and the read instruction, calculations between the data are not executed. For this reason, even in a case where the exception is detected in the middle of the execution of these instructions, the plurality of data stored in all the external storage devices or the plurality of data read from all the external storage devices coincide with each other by re-executing the target instruction until the reconnection of each of the CPUs carried out as the interrupt processing.

In addition, each of the CPUs may store information, indicating a portion for which the data transfer is completed (hereinafter, referred to as a "data transfer completed portion") or a portion for which the data transfer is left uncompleted (hereinafter, referred to as a "data transfer non-completed portion"), in the register or in the main memory 3 when the exception, resulted from the disconnection of the external storage device, is detected. In the above case, each of the CPUs performs processing of the above disclosed dynamic configuration change test on the data transfer non-completed portion, based on the information that indicates the data transfer completed portion or the data transfer non-completed portion. Only the data transfer non-completed portion remains the target of the data transfer even when the write instruction and the read instruction (that is to say, the data transfer instruction) are repeated. Consequently, this makes it possible to achieve strict validation of the data transfer associated with the interrupt.

As disclosed above, according to the embodiment, the CPU accessing to the external storage device having been disconnected from the main system 2 repeats executing the data transfer instruction and re-setting the stored initial value until the data transfer instruction is terminated normally. This allows the plurality of data that is written to or read from all the external storage devices which are connected to the main system 2 to coincide with each other when the data transfer instruction is completed normally. Consequently, a change in configuration of the access control register, execution of data restoration processing, and stop of the test becomes unnecessary, and as a result thereof, the test efficiency may be improved.

Each of the CPUs concurrently executes the program for the dynamic configuration change test in the above embodiment. However, the program for this dynamic configuration change test may be incorporated into the OS and executed by each of the CPUs. In the latter case, since the dynamic configuration change test of the main system may be validated under the environment where the external storage devices and other devices, for example, a channel, are in operation, scope of validation of the dynamic configuration change test may be enhanced.

The write instruction and the read instruction are executed in the above embodiment. However, it may also be possible that at least either of the instructions is executed. This is because that if either of the instructions is executed, the plurality pieces of data stored in or read from all the external storage devices coincide with each other.

One example of the execution may be S14 and S23. One example of storing may be S12 and S16. One example of re-setting may be S22 and S28. One example of the control unit may be each of the CPUs. An executing unit, a storing unit, and a re-setting unit may be each of the CPUs executing the execution, the storing, and the re-setting.

The advantageous effect that is the same as or similar to that obtained by the above disclosed embodiment may be achieved by supplying one or more of the main systems with a recording medium storing a software program for achieving functions of one or more of the main system and by causing each of the CPUs to read and execute the program stored in the storage device(s). As to the recording medium for supplying the program, for example, there may be mentioned a CD-ROM, DVD, SD card or the like.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising non-transitory computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Moreover, the advantageous effect that is the same as or similar to that obtained by the above disclosed embodiment may also be achieved by causing each of the CPUs, included in one or more of the main systems, to execute the software program for achieving the functions of one or more of the main systems.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A test method, comprising:
executing a data transfer instruction with regard to transfer of data between a plurality of multiplexed storage devices and a plurality of main systems logically connected to the plurality of storage devices;
storing an initial value of an operand upon execution of the data transfer instruction;
re-setting the stored initial value to the operand upon occurrence of an interrupt triggered by an exception;
repeatedly executing the data transfer instruction and re-setting the stored initial value to the operand, by a main system accessing the storage device, until the data transfer instruction is completed normally;
storing information that indicates one of a data transfer completed portion and a data transfer non-completed portion, upon the occurrence of the interrupt triggered by the exception, in storing the initial value of the operand; and
repeatedly executing the data transfer instruction and re-setting the initial value to the operand for the data transfer non-completed portion, by the main system accessing the storage device, based on the information that indicates one of the data transfer completed portion and the data transfer non-completed portion, until the data transfer instruction is completed normally.

2. A test method, comprising:
executing a data transfer instruction with regard to transfer of data between a plurality of multiplexed storage devices and a main system that is logically connected to the plurality of storage devices and includes a plurality of control units;
storing an initial value of an operand upon execution of the data transfer instruction;
re-setting the stored initial value to the operand upon occurrence of an interrupt triggered by an exception resulted from disconnection of at least one of the plurality of storage devices;
repeatedly executing the data transfer instruction and the re-setting the initial value to the operand, by a control unit accessing the storage device, until the data transfer instruction is completed normally;
storing information that indicates one of a data transfer completed portion and a data transfer non-completed portion, upon the occurrence of the interrupt triggered by the exception, in storing the initial value of the operand; and
repeatedly executing the data transfer instruction and re-setting the initial value to the operand for the data transfer non-completed portion until the data transfer instruction is completed normally by the control unit, based on the information that indicates one of the data transfer completed portion and the data transfer non-completed portion.

3. The test method according to claim 2 further comprising:
repeatedly executing the data transfer instruction, storing the initial value of the operand, and re-setting the initial value to the operand, by the control unit accessing the storage device without being disconnected from the main system, until the data transfer instruction is completed normally.

4. The test method according to claim 2, wherein
the data transfer instruction is at least one of a write instruction and a read instruction.

5. The test method according to claim 2, wherein
the operand is a plurality of general-purpose registers and the initial value of the operand is an address of the storage device, a data length of the transferred data, and an address of a memory included in the main system that are stored in the plurality of general-purpose registers.

6. A non-transitory computer-readable recording medium storing a test program, the test program causing a computer to execute a method comprising:
executing a data transfer instruction with regard to transfer of data between a plurality of multiplexed storage devices and a plurality of computers logically connected to the plurality of storage devices;
storing an initial value of an operand upon execution of the data transfer instruction;
re-setting the stored initial value to the operand upon occurrence of an interrupt triggered by an exception;
repeatedly executing the data transfer instruction and re-setting the stored initial value to the operand, by a computer accessing the storage device, until the data transfer instruction is completed normally
storing information that indicates one of a data transfer completed portion and a data transfer non-completed portion, upon the occurrence of the interrupt triggered by the exception, in storing the initial value of the operand; and
repeatedly executing the data transfer instruction and re-setting the initial value to the operand for the data transfer non-completed portion until the data transfer instruction is completed normally, by the computer based on the information that indicates one of the data transfer completed portion and the data transfer non-completed portion.

7. The non-transitory recording medium according to claim 6, wherein the test program is incorporated into an operating system in the computer.

8. The non-transitory recording medium according to claim 6, wherein
the computer includes a plurality of control units; and
executing the data transfer instruction and re-setting the initial value to the operand are repeated until the data transfer instruction by the control unit accessing the storage device is completed normally.

9. The non-transitory recoding medium according to claim 8, the method further comprising:
storing information that indicates one of a data transfer completed portion and a data transfer non-completed portion, upon the occurrence of the interrupt triggered by the exception, in storing the initial value of the operand; and
repeatedly executing the data transfer instruction and re-setting the initial value to the operand for the data transfer non-completed portion, by the control unit, based on the information that indicates one of the data transfer completed portion and the data transfer non-completed portion, until the data transfer instruction is completed normally.

10. A test system, comprising:
a plurality of multiplexed storage devices;
an execution unit that executes a data transfer instruction with regard to transfer of data between the plurality of storage devices and a plurality of test devices logically connected to the plurality of storage devices;
a storing unit that stores an initial value of an operand upon execution of the data transfer instruction; and
a re-setting unit that re-sets the stored initial value to the operand upon occurrence of an interrupt triggered by an exception, wherein
executing the data transfer instruction and re-setting the stored initial value to the operand are repeated, by a test device accessing the storage device, until the data transfer instruction is completed normally,
the storing unit stores information that indicates one of a data transfer completed portion and a data transfer non-completed portion, upon the occurrence of the interrupt triggered by the exception, in storing the initial value of the operand, and
executing the data transfer instruction and re-setting the initial value to the operand for the data transfer non-completed portion are repeated based on the information that indicates one of the data transfer completed portion and the data transfer non-completed portion, until the data transfer instruction is completed normally.

11. The test system according to claim 10, wherein
the test device includes a plurality of control units; and
executing the data transfer instruction and re-setting the initial value to the operand are repeated until the data transfer instruction by the control unit accessing the storage device is completed normally.

* * * * *

UNITED STATES PATENT AND TRADEMARK OFFICE
CERTIFICATE OF CORRECTION

PATENT NO. : 8,392,759 B2
APPLICATION NO. : 12/789800
DATED : March 5, 2013
INVENTOR(S) : Masaru Mishuku It is certified that error appears in the above-identified patent and that said Letters Patent is hereby corrected as shown below:

In the Claims

Column 12, Line 3, In Claim 9, delete "recoding" and insert -- recording --, therefor.

Signed and Sealed this
Thirteenth Day of August, 2013

Teresa Stanek Rea
*Acting Director of the United States Patent and Trademark Office*